United States Patent
Morley

[11] 3,908,531
[45] Sept. 30, 1975

[54] AUTOMATIC FRENCH FRYER

[76] Inventor: Fred W. Morley, c/o Rotamation Inc., 1450 N. Pershing Ave., Indianapolis, Ind. 46222

[22] Filed: Apr. 2, 1974

[21] Appl. No.: 457,194

[52] U.S. Cl. .................... 99/336; 99/355; 99/407
[51] Int. Cl.² ........................................ A47J 37/12
[58] Field of Search ............ 99/335, 336, 355, 404, 99/407, 410, 411, 412, 413, 414

[56] References Cited
UNITED STATES PATENTS

| | | | |
|---|---|---|---|
| 2,550,758 | 5/1951 | Bemis | 99/336 |
| 2,766,680 | 10/1956 | Tagliaferri | 99/336 |
| 3,225,681 | 12/1965 | Wells | 99/336 |
| 3,430,553 | 3/1969 | Di Pietro | 99/336 |
| 3,525,299 | 8/1970 | Gouwens et al. | 99/336 |
| 3,667,373 | 6/1972 | Sicher et al. | 99/407 |
| 3,690,247 | 9/1972 | Van Cleven et al. | 99/355 |
| 3,818,820 | 6/1974 | Harris et al. | 99/407 |

*Primary Examiner*—Richard E. Aegerter
*Assistant Examiner*—Richard R. Stearns
*Attorney, Agent, or Firm*—Trask, Jenkins & Hanley

[57] ABSTRACT

An automatic French fryer in which a cooking basket, upon completion of a variable cooking time, is first lifted to drain the food and then tipped to dump the food to a receiving tray. The basket is engaged by a hook on a flexible strip extending out of the tank over an arcuate tank lip and connected by a mechanical linkage to a motor. An adjustable timer is started when the cooking starts and acts at the end of the cooking time to energize the motor to cause the hook to first lift the basket out of the tank and then pull it over the lip to a partially inverted position against supporting stops and thereby dump the cooked product into the receiving tray. The motor operating cycle then returns the hook to its starting position, leaving the basket in its partially inverted position until it is manually removed for a new use.

18 Claims, 6 Drawing Figures

U.S. Patent  Sept. 30,1975  Sheet 1 of 2  3,908,531

AUTOMATIC FRENCH FRYER

BACKGROUND OF THE INVENTION

This invention relates to automated cooking eqiupment, and more specifically, to a French fryer wherein fried food product is automatically removed from a cooking vessel and transferred to a holding station upon completion of a predetermined cooking time.

French fryers are widely used in the restaurant business for cooking various food products such as French fried potatoes, fish, and chicken. Typically, French fryers comprise a deep tank containing a pool of cooking oil in the lower part of the tank, heated by immersed electric heating elements, or by a gas flame. The uncooked food product is placed in a basket which is received in the heated oil for the desired cooking period. When the product is done, the basket should be removed from the oil and the product either served immediately or transferred to a holding station where it can be kept fresh and crisp by, for example, radiant heat until it is served.

Product doneness is sometimes determined by visual inspection or by audio timers set to ring at the end of the desired cooking time. The visual inspection method requires constant operator attention and skill to assure that each product batch reaches the desired doneness without overcooking, while the timer method gives the operator limited freedom to work at other kitchen tasks during the cooking period. Neither method has proven to be satisfactory, however, because in both the operator is required to stop whatever he might be doing upon completion of the cooking period and immediately remove the basket from the oil to terminate cooking. This immediate attention precludes the operator from effectively accomplishing other kitchen tasks while running the fryer, and such a limitation upon kitchen personnel is particularly undesirable in the fast food business where it is desirable for one operator to attend to several tasks simultaneously. As a practical matter, fryer operators tend to leave the product in the oil until they find it convenient to remove it, and this results in an inconsistently and often overcooked product.

Heretofore, French fryers have been developed which automatically lift the product basket out of the hot oil upon completion of the cooking time. In such fryers, the product basket is hung on hooked posts adjacent to the tank, and the posts are lowered to put the basket into the oil. After a timed cooking period, the posts automatically rise to their original positions to lift the product basket to a position above the oil and thereby automatically terminate the cooking process. However, the fryer operator is still required to promptly transfer the product away from above the hot oil to prevent product degradation due to the high heat and humidity above the oil. This is especially important when the food product is French fried potatoes, since the fried potatoes quickly become limp and soggy if they are held over the hot oil for even a short period of time. Therefore, the operator still must interrupt whatever he is doing and immediately transfer the product to a proper holding station where the product can be kept fresh and crisp until it is served.

The present invention overcomes the disadvantages and difficulties experienced in the prior art by providing a French fryer which, with relatively simple mechanism, automatically removes the food product from the hot cooking oil upon completion of a predetermined cooking period, and then transfers the fried food product away from above the hot oil to a receiving or holding station where the product may be kept crisp and warm until it is served.

SUMMARY OF THE INVENTION

A French fryer embodying the present invention will have a deep tank for containing a pool of hot cooking oil, and a food basket having a cooking position low in the tank for submerging the food in the pool of oil. In accordance with the invention, the fryer is provided with a food receiver outside the tank, and with power-driven lift mechanism having an operating cycle in which it first lifts the basket to a drainage position above the oil in the tank and thereafter tips the basket outward from above the oil to a dumping position over the food receiver to empty the food from the basket to the receiver. The lift mechanism is controlled by an automatic control device which automatically actuates such mechanism for operation through an operating cycle when the food being cooked is done. Such automatic control may be a simple timer which is preset for a desired cooking time and is started manually when the food is placed in the oil.

The lift mechanism preferably comprises a lift bar or other lift element on one wall of the basket, and a movable lift hook or other lift member which normally lies in a rest position in loose engagement with the lift element, or in a position for engagement with the lift bar as the member starts its lift movement, so as to leave the basket free for manual manipulation if desired. The movable hook is preferably carried by a flexible metal strip slidably guided in a track over a convex lip formed along the top of one tank wall. The opposite end of the strip extends through a slot in the tank housing and is there connected to power-driven mechanism, such as linkage driven by an electric gear-motor. Guides are provided for guiding the movement of the basket when lifted by the lift hook, and these may consist of rails on the basket which slide on the wall and lip of the tank to guide its rising and tipping movement.

When the basket reaches its tipped position, it moves into engagement with fixed supports which will hold it in such position while the movable lift hook and the flexible strip which carries it are returned to their starting positions. This leaves the mechanism ready for a new cooking cycle and leaves the basket ready to be picked up by the operator, refilled with food, and returned to the tank for the new cooking cycle.

BRIEF DESCRIPTION OF THE DRAWINGS

The accompanying drawings illustrate the invention. In such drawings.

DETAILED DESCRIPTION OF THE PREFERRED EMBODIMENT

Figure 1:
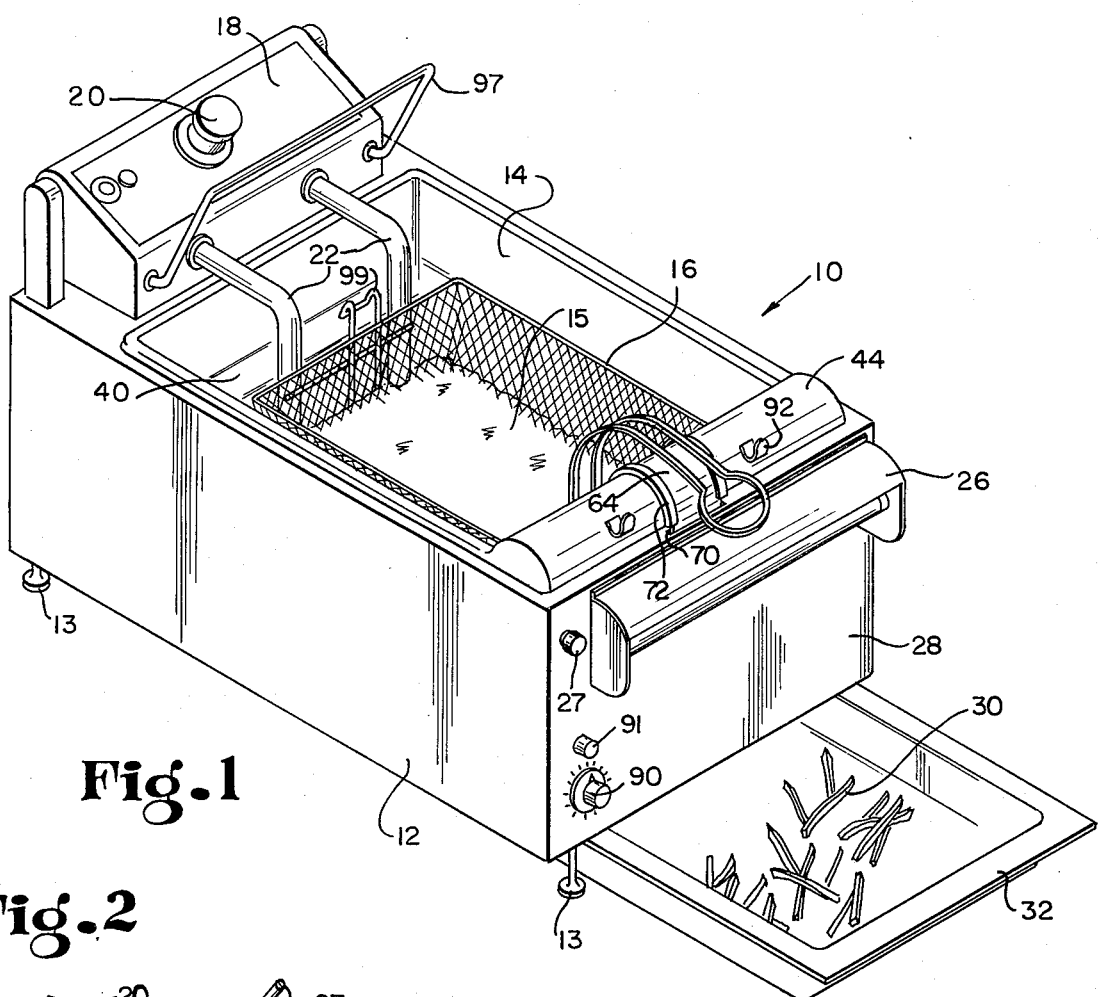
FIG. 1 is a perspective view of a French fryer of this invention showing the product basket within the cooking tank.

The French fryer 10 shown in FIG. 1 generally comprises a housing 12 having a tank 14 for holding a quantity of cooking oil 15 and for receiving a basket 16 containing the food product to be fried. A temperature control panel 18 is mounted atop the rear of the housing 12, and an immersible heating element 22 extends from the control panel 18 into the tank 14 to heat the cooking oil 15. Conveniently, the housing 12 is supported by adjustable legs 13 to maintain the unit in a level position.

Figure 2:
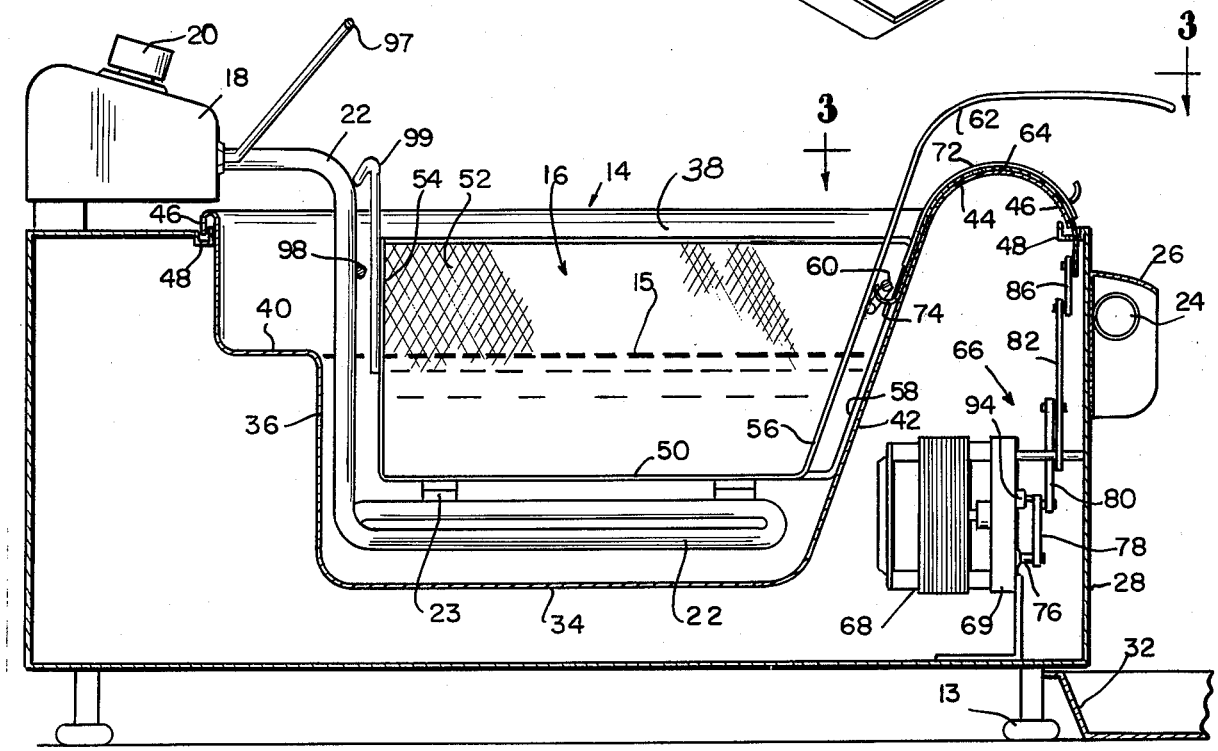
FIG. 2 is a vertical section of the French fryer of FIG. 1.

The cooking tank 14 is formed of stainless steel or the like, and as shown in FIG. 2, has a horizontal bottom wall 34 and generally upright rear and side walls 36 and 38, respectively. Desirably, a ledge 40 is formed around the rear and sides of the tank to catch any spills and overflows. The front end wall 42 of the tank extends upward and outward from the bottom wall 34 at an angle of about 70°, and terminates as an upwardly convex, arcuate lip 44 extending transversely across the front end of the tank. A downward projecting rim 46 extends about the outer tank periphery and is received in a mating flange 48 formed on the unit housing 12 to permit the tank to be selectively removed from the housing for cleaning.

The heating elements 22 have their electric terminals located within the control panel 18. They are thermostatically controlled and temperature is regulated by a knob 20 on the panel. The elements 22 extend from the housing 18 forward over the tank ledge 40 and downward into the cooking oil along the tank rear end wall 36, and then horizontally along the tank bottom 34. They may carry support rails 23 to support the basket. Desirably, the elements 22 are hinged within the control panel 18 in a conventional manner to permit them to be pivoted upward about the panel 18 when it is desired to remove the tank 14 from the unit housing 12 for cleaning.

Figure 3:
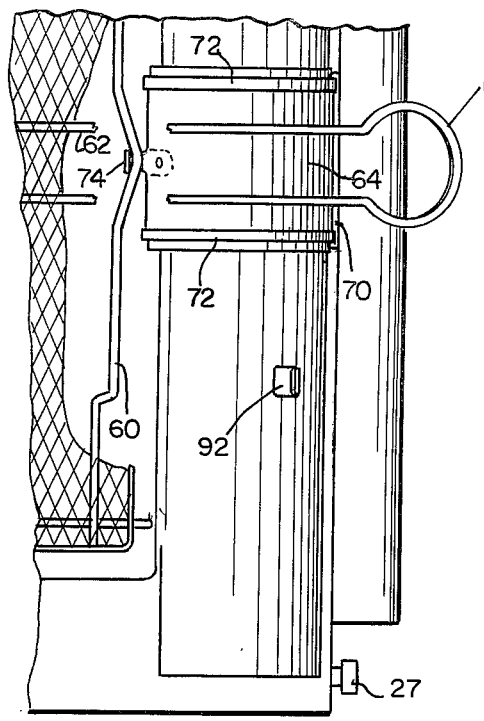
FIG. 3 is an enlarged fragmentary plan view taken on line 3—3 of FIG. 2.

The fryer basket 16 is formed from stainless steel mesh or the like, and has a horizontal bottom 50 adapted to rest on the rails 23 of the heating elements 22. The side faces 52 and the rear face 54 of the basket are generally upright, while the front end face 56 of the basket is sloped at about 70° from the horizontal and is generally parallel with the tank end wall 42. A pair of laterally spaced runners 58 extend along the basket face 56 to ride on the tank end wall 42 and maintain the basket face in spaced parallel relation with the tank wall. As shown best in FIG. 3, a lift-bar or arm 60 extends transversely across the basket end face 56 and is spaced upward and outward from the basket face for a substantial portion of the width thereof, for reasons which will hereafter become more apparent. The basket 16 is also provided with a handle 62 projecting generally upward from the basket end face 56 in the same plane therewith and then extending generally outward over the arcuate lip 44.

The rear end of the basket may carry a conventional hook 99 adapted to be engaged over a support bar 97 projecting forward from the panel 18. A cross bar 98 is mounted on the heater elements 22 in position to support the bottom portion of the basket when the basket is hooked on the bar 97. This allows the basket to be hung above the oil in a conventional manner if desired, but is not needed by my invention.

For automatically lifting the basket, a flexible metal strip 64 is mounted against the curved surface of the tank lip 44, and guided by a pair of guides forming a track 72. One end of the strip extends through a slot 70 in the housing 12 and is coupled through a mechanical linkage 66 to an electric motor 68 mounted within the unit housing 12. The strip 64 extends downward into the tank 14 along the angular tank end wall 42 and carries a hook 74 within the tank, positioned to releasably engage the central portion of the tranverse arm 60 on the basket. The strip is sufficiently flexible to fit the contour of the arcuate lip and to freely slide back and forth within the track, but the strip is sufficiently rigid to prevent binding or buckling within the track. If desired, the lip surface beneath the strip 64 may be coated with a non-toxic anti-friction substance, such as a tetrafluoroethylene resin sold under the trademark "Teflon" to reduce sliding friction. Conveniently, the strip slides out of the track when the tank is removed from the housing for cleaning.

Figure 4:
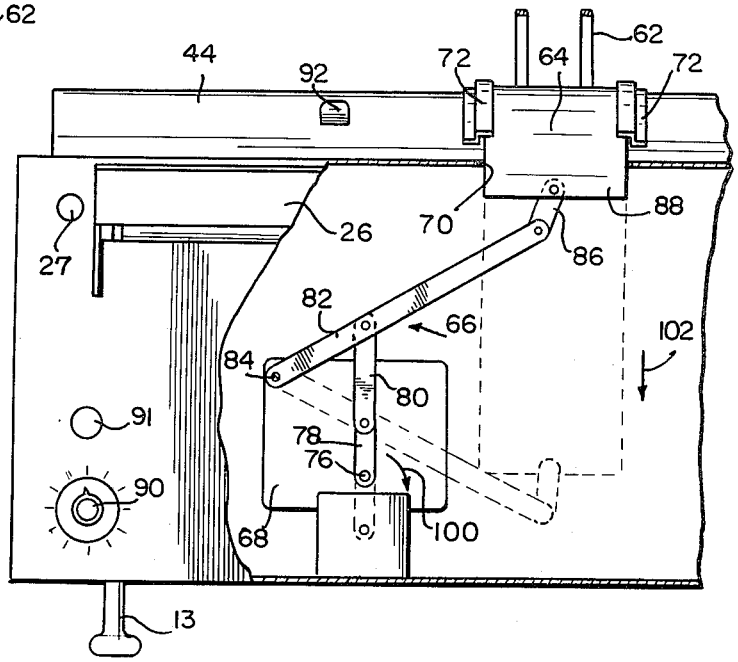
FIG. 4 is an end view of the French fryer with portions broken away.

The driving linkage for the strip is shown in FIGS. 2 and 4. The motor 68 drives a gear reducer 69 which has an outwardly projecting shaft 76 which carries a short crank link 78. The crank link 78 is coupled through a connecting link 80 to an intermediate point on a lever 82, which has one end pivotally mounted at a fixed point to a pin 84 mounted on the motor 68. The opposite end of the lever 82 is connected through a coupling link 86 to the end 88 of the flexible strip 64 within the housing.

The motor 68 is responsive to a conventional timer (not shown) mounted within the housing 12 and controlled by a knob 90 on the forward housing end wall 28 which sets the timer for a selected cooking period. The timer cycle is initiated by pressing a "start" button 91 which is also mounted on the housing end wall 28.

The timer and linkage operates as follows. At the end of the cooking time for which the timer is set, it automatically closes a switch to energize the motor 68 for a one revolution cycle. the motor drives the crank 78 at one RPM in a clockwise direction, as shown by arrow 100 in FIG. 4, to pull the lever 82 downward. This pulls the flexible strip 64 downward within the housing 12 as shown by arrow 102, and thereby also pulls the hook 74 and the basket 16 upward along the inclined tank end wall 42, as shown by arrow 104 in FIG. 5. Desirably, the rate of rotation of the crank link 78 is, for example, one revolution per minute, and such that the basket remains above the cooking oil 15 for a period of say about 15 seconds to allow oil to drain from the basket and the fried product back into the tank.

Figure 6:
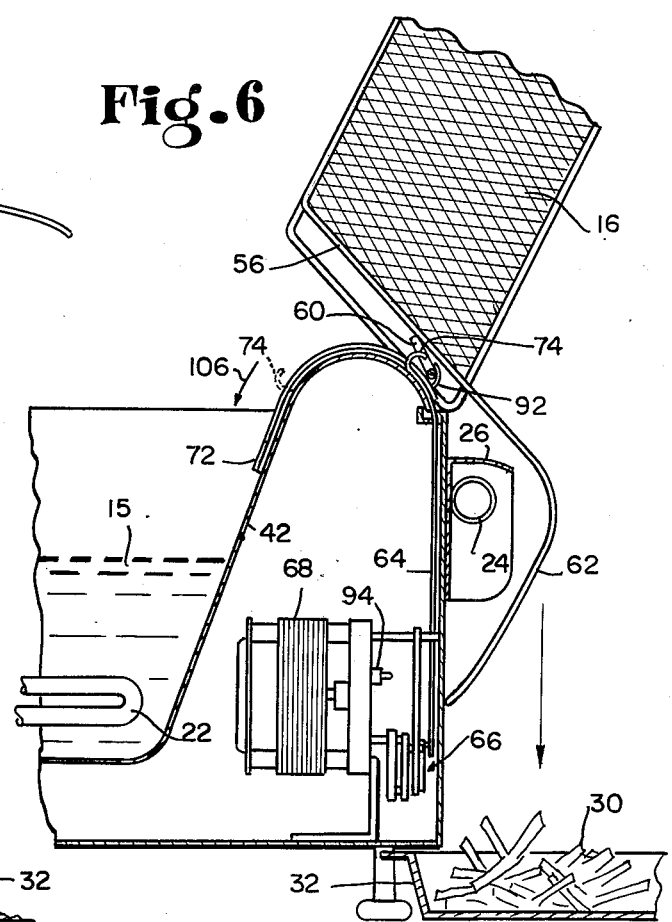
FIG. 6 is a fragmentary vertical section similar to FIG. 5 with the basket in its partially-inverted position.

As the strip is pulled further downward within the housing 12 toward the 180° position of the crank 78 shown by the dotted lines in FIG. 4, the hook 74 continues to pull the basket upward over a portion of the arcuate lip 44 to partially invert the basket. At the 180° crank link position, the outward extending portion of the basket arm 60 moves into engagement with a pair of hooked stops 92 mounted on the outer slope of the arcuate lip 44, and the basket tilts about the stops 92 until the basket handle 62 engages the housing front end wall 28, as shown in FIG. 6. The basket is then supported in a partially inverted position above the lip 44 by the stops 92 and the handle 62 with the front end face 56 of the basket disposed at a downwardly sloped angle so that the fried food product 30 tumbles out of the basket and into the holding station or pan 32. Conveniently, the motor continues to rotate the crank 78 to complete one 360° cycle. This returns the lever 82 to its original position and moves the strip hook 74 back into the tank as shown in dotted lines and by the arrow 106 in FIG. 6, to its original starting position. When the crank link 78 reaches the 360° position, it actuates a microswitch 94 mounted on the motor 68 which opens the motor energizing circuit to turn off the motor.

Desirably, a heat lamp 24, for example, a quartz tube or the like, is mounted on the housing forward end wall 28 and is controlled by an on-off switch 27. The lamp 24 is protected from contact with dripping cooking oil or any of the fried food product by an overhanging shroud 26. The lamp is operative to direct radiant heat to the already-fried food product within the holding pan 32 to keep the product fresh and crisp for relatively long time periods, about ten minutes, for potatoes and longer for other foods.

Operation of the French fryer shown is as follows. The cooking oil is normally maintained at the temperature preset by the thermostatic control 20 mounted on the control panel 18. When desired, the basket 16 is filled with a quantity of food product, and is manually placed within the cooking tank 14. The basket will rest on the support rails 23, the basket runners 58 will lie in contact with the angular tank wall 42, and the basket arm 60 will be received loosely within the hook 74 on the flexible strip 64.

Figure 5:
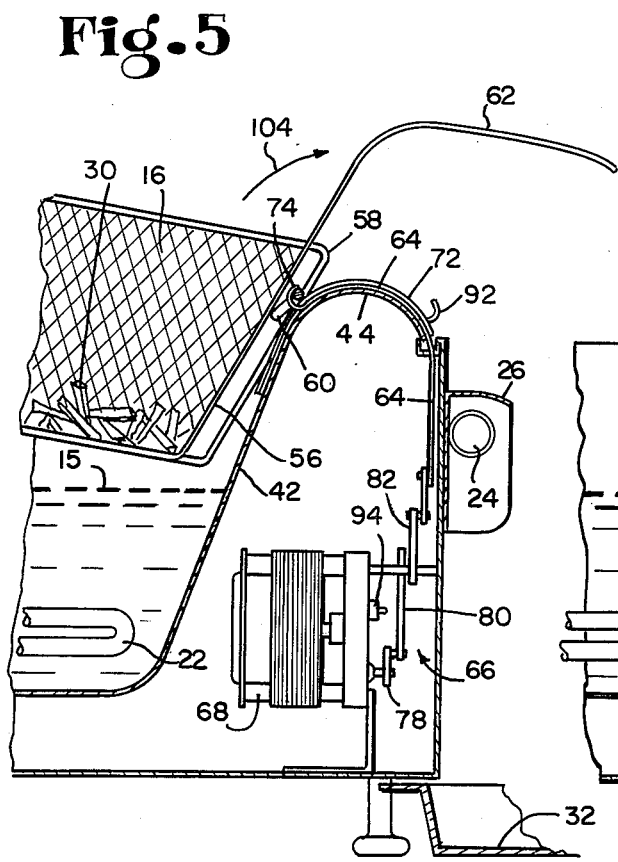
FIG. 5 is a fragmentary vertical section showing the basket partially lifted out of the oil tank.

If manual operation and control is desired, nothing further is done, and the timer is not actuated. If automatic operation is desired, the timer is set by the knob 90 for the desired cooking period and the start button 91 is depressed to initiate the automatic cycle. The timer will provide a cooking period in accordance with the setting of the knob 90 and will then automatically energize the motor 68 for a one-revolution cycle. In this, the motor 68 acts through the linkage 66, as explained above, to pull the lift hook 74 and thereby also the basket 16 upward out of the hot cooking oil, as shown in FIG. 5. As movement of the hook continues, the basket 16 slidably moves on its runners 58 up the inclined tank wall 42 and over the arcuate lip 44 until the basket lift arm 60 is received in the laterally spaced fixed stop hooks 92. The basket rotates within the stop hooks 92 to a partially-inverted terminal position, as shown in FIG. 6, with the basket handle 62 engaging the forward wall 28 of the housing 12, and the fried product slides out of the basket along the now downwardly sloped basket end face 56 over the lamp shroud 26 and into the holding pan 32.

The motor 68 continues to turn the crank 78, and move the lift hook 74 back into the cooking tank to its starting position. As soon as the hook 74 reaches its starting position, the crank link 78 contacts the microswitch 94 which opens the motor circuit to turn off the motor, and the fryer is ready for another cooking cycle. As the lift hook 74 returns, it leaves the basket 16 supported by the stops 92 in its partially-inverted dumping position above the lip 44 where it is within easy reach of the fryer operator. When a second batch of product is desired, the operator picks the basket off the lip, refills it with food product, places it in the cooking tank, and re-starts the cooking cycle.

This invention provides a fryer for producing a French fried food product of consistently high quality. The cooking time for each batch of product is exactly the same since the product is automatically removed from the hot oil when the product reaches the desired doneness. The product is drained briefly above the oil and is automatically transferred to a holding station where it can be kept crisp and fresh by radiant heat for relatively long time periods. All of this is accomplished automatically with no attention required of the fryer operator once the cooking cycle has been started.

Various modifications of the above-described French fryer are possible without varying from the scope of this invention. For example, the basket can be made to tilt to the side instead of to the front. The fryer can be manufactured in any of several sizes to suit various cooking requirements. The unit housing and the oil tank can be made larger to permit reception of two or more baskets at the same time, and separate lift and tilt mechanisms can be provided for the separate baskets. Fixed tank models for gas heat or styles where the arcuate lip is part of the housing rather than the tank can be used. The flexible strip mechanism is the preferred mechanism, but other mechanism may be used to effect the desired lift and tilt movement of the basket. Also, if desired, the timer which energizes the motor can be replaced by a computer sensor immersed in the cooking oil and operative to actuate the basket lifting and tilting action in response to when the product is shown thereby to be done.

A French fryer of this invention can also be manually operated, if desired, for occasional special frying jobs which require close operator attention. For example, if only one batch of a particular product is desired, the basket containing that product can be manually placed in the tank and observed by the operator until the product is done. In such case, the timer is not actuated, and the automatic mechanism remains inoperative. The flexible strip 64 and hook 74 do not interfere with such manual operation, but leave the French fryer free for convenient and conventional manual use. When so used, the basket may be supported over the hot oil for a brief period to allow the product to drain. For this purpose, as shown in FIGS. 1 and 2, the basket may be hung by its hook 99 on the bracket 97 which extends forward and upward from the control panel 18, and will rest against the support bar 98 connected between the heating elements 22.

I claim:

1. An automatic French fryer comprising a tank for containing a pool of hot cooking oil; a basket for containing food to be cooked and having a cooking position in the tank for submerging the food in the pool of oil; a cooked-food receiver outside said tank; support means for supporting the basket in a dumping position relative to said receiver, power-drive lift means having a disengageable connection with the basket and having an operating cycle in which it lifts the basket to a drainage position over the tank and thereafter tips the basket outward from above the tank to its dumping position over the receiver to empty the food from the basket to the receiver, and then disengages the basket and returns to its starting position, leaving the basket supported by said support means in said dumping position; and means to automatically activate said lift means for operation through its operating cycle when the food is cooked done.

2. An automatic French fryer as in claim 1 in which said lift means comprises a lift element on the basket adapted to be engaged by a movable lift member; a movable lift member having a rest position and movable therefrom in an operative path in engagement with said basket lift element; guide means for guiding the movement of the basket as it is moved by the lift member; and drive means connected to drive said lift member in said path, said guide means and lift member being operative, as said lift member is driven through said operative path, to lift said basket to a drainage position above the tank and thereafter to tip the basket outward from above the tank to its dumping position over the receiver to empty the food from the basket to the receiver.

3. An automatic French fryer comprising a tank for containing a pool of hot cooking oil; a basket for containing food to be cooked and having a cooking position in the tank for submerging the food in the pool of oil; a cooked-food receiver outside said tank; a lift element on the basket adapted to be engaged by a movable lift member; a flexible metal strip having a basket-engaging lift member at its free end and mounted in a track, said lift member having a rest position and being movable therefrom in an operative path in engagement with said basket lift element and guided by said track, said track having an upward extending section to guide the lift member to lift said basket to a drainage position above the tank and a curved section to thereafter guide the hook in an outward curved path to tilt the basket outward to a dumping position over the receiver to empty the food from the basket to the receiver.

4. An automatic French fryer as in claim 3 in which said track is formed against an outward curving lip having a fixed position relative to the tank.

5. An automatic French fryer as in claim 3 in which said lift element and lift member comprise a hook and a hook-engaging part which, when the basket is in cooking position, are freely disengageable whereby the basket can be lifted manually from and returned to cooking position in the tank.

6. A French fryer comprising a tank for holding a quantity of cooking oil and for receiving in cooking position a basket containing food product to be fried, said tank having an upwardly convex lip extending across the top of one of the walls thereof; heating means for maintaining the oil at cooking temperature; adjustable timing means for selectively controlling the product cooking time; a flexible strip having a lift member thereon for releasably engaging the basket in said cooking position and extending therefrom over said lip and outside said tank; basket support means mounted on said lip; and drive means responsive to said timing means and connected to said flexible strip for moving said lift element upward out of said tank and over a portion of said lip to lift the basket from its cooking position in said tank to a partially inverted position over said lip and supported by said support means to cause the food product to tumble out of the basket to a predetermined position outside said tank.

7. A French fryer as set forth in claim 6 wherein said drive means is operative to return said strip to its original position after the basket is supported by said support means.

8. A French fryer as set forth in claim 7 with the addition of switch means operative to deactivate said drive means when said strip returns to its original position.

9. A French fryer as set forth in claim 6 wherein a track is mounted on said lip, and said flexible strip is received in and slidably guided over said lip in said track.

10. A French fryer as set forth in claim 6 wherein said lift member comprises an upwardly open hook which releasably engages an element on the basket.

11. A French fryer as set forth in claim 6 wherein said basket support means comprises a pair of hooks mounted on said lip for supporting the basket in a partially inverted position.

12. A French fryer as set forth in claim 6 wherein said drive means comprises an electric motor coupled through mechanical linkage to said flexible strip.

13. A French fryer as set forth in claim 6 wherein the tank wall having said convex lip is inclined outward from the tank bottom, and the lifting movement of the basket carries the basket upward and outward along said inclined wall.

14. A French fryer comprising a housing; a tank received in said housing for holding a quantity of cooking oil and for receiving a basket containing food product to be fried, said tank having one wall inclined outward from the tank bottom and terminating at its upper end in a transversely extending and upwardly convex lip; heating means for maintaining the oil at cooking temperature; timing means for controlling the product cooking time; a flexible strip slidably received in a track mounted on said lip, said strip extending from outside said tank over said lip and into said tank and having basket-engaging means adjacent its end within said tank for releasably engaging the basket; drive means connected to said strip and mounted within said housing, said drive means being actuated in response to said timing means and being operative to move said basket-engaging means upward out of said tank and over a portion of said lip to lift the basket upward from a cooking position in said tank and to tilt the same to a partially inverted position atop said lip, whereby the food product contained therein tumbles out of the basket and to a receiving station, said drive means returning said basket-engaging means to its original position; and support means for retaining said basket in said partially inverted position atop said lip.

15. A French fryer as set forth in claim 14 wherein the inclined wall of said tank is inclined at an angle of about 70° from the horizontal.

16. A French fryer as set forth in claim 14 wherein said drive means comprises an electric motor connected through mechanical linkage to said strip, and further comprising a switch operative to deactivate said drive means upon return of said strip to its starting position.

17. A French fryer as set forth in claim 14 wherein said support means comprises a pair of laterally spaced hooks mounted on said lip.

18. A French fryer as in claim 14 with the addition of a basket for containing food product to be fried and having a cooking position within said tank, said basket having an outwardly inclined wall adjacent the inclined tank wall and generally parallel therewith.

* * * * *